Figure 1:
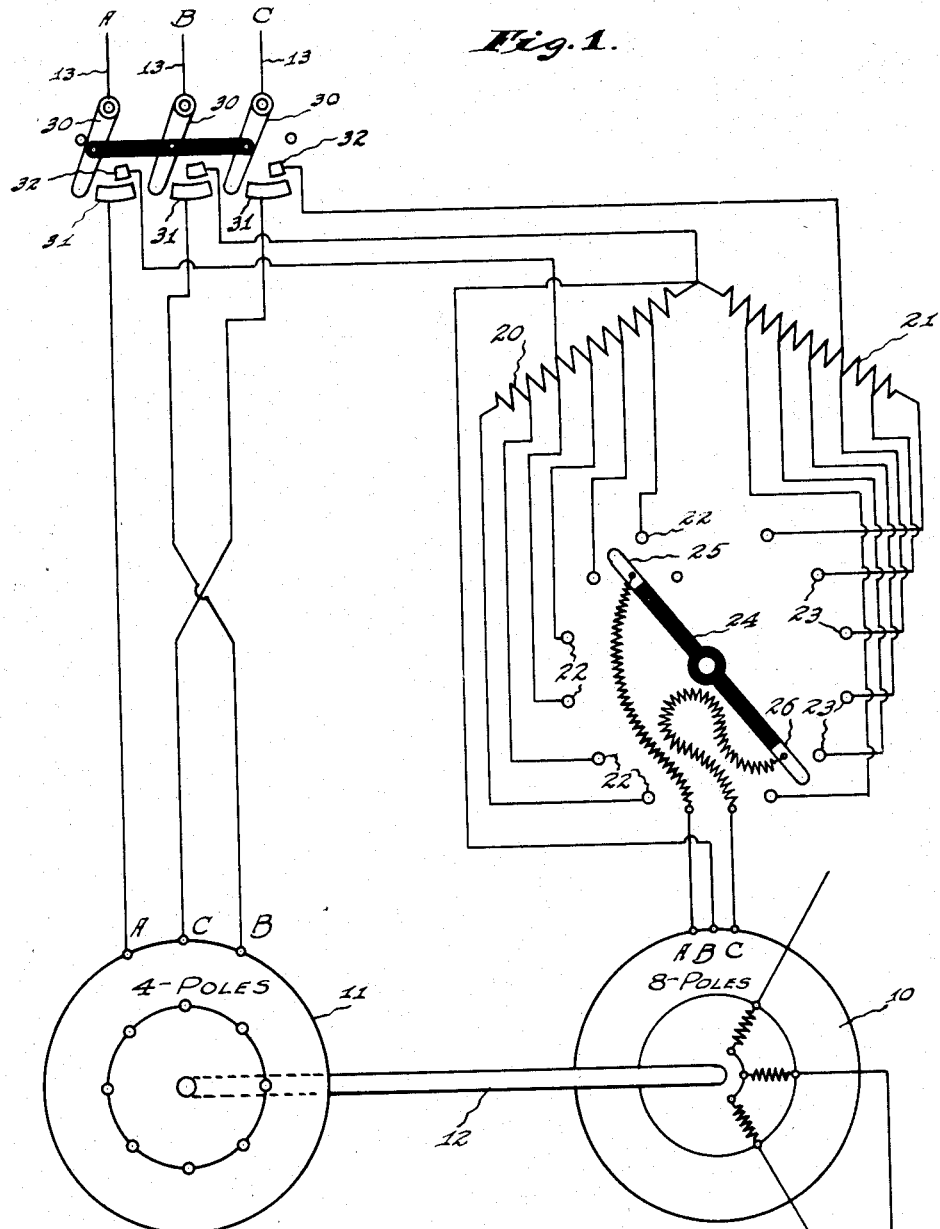

Dec. 8, 1936.                R. NOTVEST                2,063,824

CONTROL SYSTEM FOR FREQUENCY CONVERTERS

Filed April 27, 1934

Inventor

ROBERT NOTVEST,

Attorneys

Patented Dec. 8, 1936

2,063,824

UNITED STATES PATENT OFFICE 2,063,824

CONTROL SYSTEM FOR FREQUENCY CONVERTERS

Robert Notvest, Indianapolis, Ind., assignor to J. D. Adams Manufacturing Company, Indianapolis, Ind., a corporation of Indiana Application April 27, 1934, Serial No. 722,638

1 Claim. (Cl. 219—8)

My invention relates to arc-welding, and particularly to an arc-welding process employing an alternating-current arc.

Alternating currents of the frequencies (25- or 60-cycle) commonly used in distribution lines in this country are relatively unsatisfactory for arc-welding. This is believed to be due to the fact that the current passes through its zero value so slowly as to permit de-ionization of the gases in the vicinity of the arc, thus rendering the arc highly unstable. Attempts have been made to remedy this condition by using a high-frequency (1000-cycle or over) current either as the welding current itself or as superposed upon a low-frequency (60-cycle or under) welding current merely to maintain ionization. Neither of these processes has proven very satisfactory commercially, the former principally because it required heavy and expensive apparatus to generate the high-frequency, high-amperage welding current, and the latter for several reasons.

It is the object of my invention to provide an arc-welding process which can be carried out with apparatus lighter and less expensive than that now necessary in commercial processes of direct-current arc-welding and also lighter and less expensive than that heretofore required for the production of high-frequency welding current. A further object of my invention is to produce, by apparatus of relatively light weight and economical construction, a welding arc having a stability equal to or greater than that of a direct-current welding arc of corresponding voltage.

I have discovered that the stability of an alternating-current welding arc is not a straight-line function of the frequency. If stability, represented by ordinates, is plotted against frequency, represented by abscissae, the resultant curve has a relatively gradual slope at frequencies below 120 cycles per second and above 200 cycles per second, but has a very steep slope over the range between 120 and 200 cycles per second. Stability co-ordinate with that of a direct-current welding arc of corresponding voltage and amperage is obtained at a frequency of about 150 cycles per second. Therefore, if stability equal to that of a direct-current arc is the only desideratum, 150-cycle current can be used. For reasons hereinafter set forth, however, I prefer to use a welding current having a frequency of about 180 cycles per second.

My preferred method of obtaining alternating current of the desired frequency from the generally available 60-cycle supply is through the use of an induction-type frequency converter. In its broader aspects, however, my invention is not limited to any particular form of apparatus.

Figure 2:
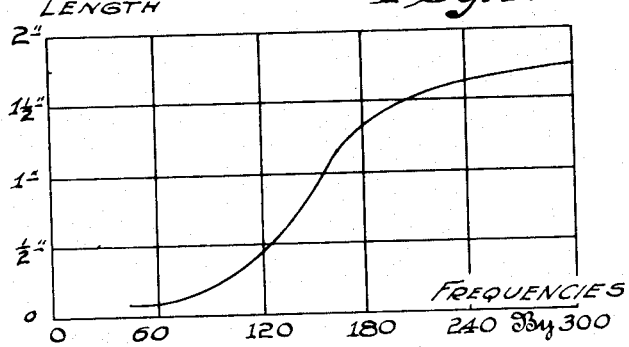

In the accompanying drawing; Fig. 1 is a diagrammatic illustration of the preferred form of apparatus used in practicing my invention; and Fig. 2 shows a curve illustrating the relation between arc-stability and frequency.

The induction-type frequency converter which I prefer to employ is, structurally, a polyphase induction motor having a wound rotor the phases of which are brought out through collector rings and brushes. Conveniently, the stator is employed as the primary and the rotor as the secondary of the frequency converter.

As is well known, the polyphase current supplied to the stator windings of such a machine creates a rotating magnetic field, and the relative rotational speed of this field and the rotor determines the frequency of the secondary current in the rotor windings. For example, if the rotor is held stationary, the frequency of the secondary current will equal that of the primary current; while if the rotor is driven at a rotational speed equal to that of the primary magnetic field but in the opposite direction, the frequency of the secondary current will be double that of the primary current.

The ordinary 60-cycle current of distribution lines can be readily converted to a frequency satisfactory for my use by employing such an induction-type frequency converter and by rotating the rotor in a reverse direction at twice the speed of the rotating magnetic field produced by the stator windings, thus generating a secondary current of 180-cycle frequency. Such an arrangement lends itself to the use of standard parts and thereby lowers the cost of the apparatus.

In the drawing, a three-phase frequency converter is denoted at 10 and is shown as direct-connected to a driving motor 11 by a shaft 12. The motor 11 is preferably an induction motor connected to the same three-phase supply lines as those which supply current to the stator of the frequency-converter 10; and, in order that the speed of the converter rotor may be a little less than twice that of the magnetic field produced by the stator windings of the converter, the converter 10 has twice as many poles as the motor 11. In the drawing, therefore, I have indicated the frequency converter 10 as having eight poles and the motor 11 as having four poles, as an example of this relation. To obtain in the converter a magnetic field which rotates in a direction opposite to that of rotor-rotation, the connections of the supply lines 13 to either the motor 11 or the converter-stator are reversed. In the drawing, such reversal is shown in the connections between the supply lines 13 and the motor 11.

The frequency converter 10 may be an ordinary form of three-phase induction motor wound to produce welding current of the desired voltage and amperage. As indicated in the drawing, the rotor windings are star-connected, and since usually only a single-phase current is desired for welding two of the rotor terminals are connected respectively to the welding electrode 17 and the work 18, while in the example shown the third rotor terminal is not used. Thus, the welding current is the vector sum of the currents in two series-connected phases of the rotor. This arrangement is merely illustrative, however, as it is possible, if desired, to employ only a single rotor phase or to use all three rotor phases and convert the three-phase current thus produced to single-phase current by additional apparatus; or the rotor might be specially wound to produce single-phase current. Obviously, the manner in which single phase welding current is derived from a polyphase rotor will govern the characteristics of the rotor winding. The illustrated arrangement utilizing series-connected phases of a polyphase rotor is preferred, at least for low-quantity production of the welding apparatus, because of the economy resulting from the use of standard parts.

For the purpose of regulating the voltage of the welding current I may employ two multi-tapped auto-transformers 20 and 21 connected respectively across two phases of the three-phase supply circuit. The line wire connected in common to the two auto-transformers is also connected to one terminal of the stator windings of the frequency-converter 10, and switch mechanism is provided for connecting the other two stator terminals to any desired pair of corresponding taps of the two auto-transformers 20 and 21, either to step up or to step down the voltage.

The drawing shows the switch mechanism just referred to as two arcuate series of stationary contacts 22 and 23 and a swinging switch arm 24 carrying two jointly movable contacts 25 and 26 co-operating respectively with the two series of fixed contacts 22 and 23 and connected to two of the stator terminals on the converter. The fixed contacts 22 are connected in order to the taps of the auto-transformer 20 and the contacts 23 are similarly connected to the taps of the auto-transformer 21 in such a way that any pair of fixed contacts 22 and 23 simultaneously engaged by the movable contacts 25 and 26 are connected to corresponding taps of the two auto-transformers.

The regulating means comprising the two auto-transformers 20 and 21 and their associated switch mechanism operates to control the strength of the rotating magnetic field produced by the windings of the converter-stator; and the strength of this magnetic field in turn determines the voltage of the current induced in the rotor windings of the converter.

As the frequency converter 10 and the motor 11 tend to rotate in opposite directions under the effect of the current supplied to them, it is desirable, when starting the apparatus, to throw the motor upon the line first in order that it may begin to rotate before current is supplied to the stator of the converter. To this end I may employ a line switch of the type indicated diagrammatically in the drawing. This switch has three jointly movable contact arms 30, connected respectively to the three wires of the supply line, and two sets of stationary contacts 31 and 32. The set of fixed contacts 31 is connected to the motor 11, and is arranged to be engaged by the arms 30 in their closing movement before such arms engage the other set of fixed contacts 32, such latter contacts being connected through the voltage-regulating mechanism to the stator of the converter 10.

In starting the apparatus, the contact arms 30 are moved into engagement with the fixed contacts 31, but are not moved far enough to engage the other set of fixed contacts 32. The resultant supply of current to the motor 11 causes it to drive the rotor of the converter 10; and after the motor has come up to speed, closing movement of the line switch may be completed to throw the converter stator upon the line.

I have referred above to the relation between the stability of an alternating-current welding arc and the frequency of the welding current. This relation is indicated by the curve shown in Fig. 2, in which stability is measured as the maximum arc-length which can be maintained between a steel plate and a commercial form of coated welding electrode. The curve of Fig. 2 represents stabilities obtained with a welding current of 120 amperes and 40 volts.

It is to be noted that the maximum arc-length which can be obtained with 60-cycle current of the stated voltage and amperage is in the neighborhood of 1/8 of an inch. Increasing the frequency from 60 to 120 cycles increases the maximum arc-length by about 1/4 of an inch, or to about 3/8 of an inch. A further increase of frequency to 180 cycles effects a marked increase in stability, for it increases the maximum arc-length from about 3/8 of an inch at 120 cycles to about 1 3/8 inches at 180 cycles. Above about 180 cycles, the per-cycle increase in stability which accompanies increased frequency gradually decreases, and above about 200 cycles again becomes relatively slight.

A direct current welding arc of 120 amperes and 40 volts has a maximum maintainable length of about 5/8 to 3/4 of an inch. This is five or six times as great as the maximum arc-length obtained with alternating current of the standard 60-cycle frequency, and approximately double the maximum arc-length obtained with alternating current of 120-cycle frequency; but only approximately half the maximum length obtainable with 180-cycle frequency. Stability co-ordinate with that of a direct-current arc is obtained at frequencies in the neighborhood of 140 to 150 cycles per second.

While frequencies in the neighborhood of 150 cycles per second would produce, in the practice of my process, a welding arc having a stability substantially equal to that of a direct-current arc of the same voltage and amperage, I prefer to use a welding current of slightly less than 180 cycles, not only because of the increased arc-stability obtained but also because it permits the use of standard electrical equipment. A commercial four-pole 60-cycle motor operates at between 1750 and 1800 R. P. M., and this speed will produce, in an eight-pole frequency converter, a secondary current of between 175 and 180 cycles per second—a frequency highly satisfactory for my purpose.

While frequencies above 180 cycles per second would produce an arc of further increased stability, not only does the increase in stability gradually lessen as the frequency thence increases, but such further increased stability is not needed in practice. Moreover, the higher the frequency, the more elaborate and expensive becomes the equipment necessary to produce it. I do not regard the increased arc-stability obtainable at frequencies above 250 cycles of sufficient importance at present to justify the increased cost of the equipment necessary to produce currents of such frequencies. Frequencies between 150 and 250 cycles are therefore preferred; and of such frequencies, I believe 180-cycle to be most satisfactory.

In an induction-type frequency converter of the kind described, a part of the energy represented by the secondary current is derived from the driving means and a part by transformer action within the converter. Specifically, the ratio of the energy resulting from transformer action to the energy derived from the driving means equals the ratio of the original frequency to the increase in frequency. In changing 60-cycle current to 180-cycle current in accordance with my process the increase in frequency is 120 cycles and, therefore, two-thirds of the electrical energy in the welding circuit is derived from the driving motor and one-third results from transformer action within the converter.

In an ordinary motor-generator set, whether used to produce direct current or alternating current, the electrical energy of the welding circuit is derived entirely from the motor. In other words, the current drawn from the supply line is all used in the motor to create mechanical energy, and the mechanical energy thus derived is then converted into electrical energy by the generator. A commercial form of welding machine (motor-generator set) for producing 200 ampere, 40 volt direct current from alternating current supply lines employs a 15 H. P. motor. In the practice of my process, I can obtain 200-volt, 40 ampere welding current with the use of a 10 H. P. motor, since only two-thirds of the energy in the welding circuit is derived from the motor. This is of great importance, as it not only reduces the cost of the welding machine but also reduces its weight; and as welding machines are nearly always portable in character, any reduction in weight is a distinct advantage.

I claim as my invention:

In a frequency converter system for use in a welding circuit having a driving motor and an induction generator whose armature is actuated by the driving motor, both motor and generator being supplied from a common power circuit, the combination of a power circuit, a motor circuit, a generator field circuit connected to the stator of the generator, switch means to insure connecting the power circuit first to the motor circuit and then to the generator circuit, and means of adjusting the generator field strength and the electrical output from the rotor of the generator, and an armature circuit associated with the rotor of the generator.

ROBERT NOTVEST.